United States Patent [19]

Shimuta et al.

[11] Patent Number: 5,395,909
[45] Date of Patent: Mar. 7, 1995

[54] COMPOSITION FOR HIGH REFRACTIVE INDEX LENS COMPRISING A COPOLYMER OF A VINYLBENZYLTHIO COMPOUND

[75] Inventors: Masanori Shimuta, Tokyo; Toru Takahashi, Kashiwa; Hisato Abe, Kashiwa; Kenichi Takahashi, Kashiwa; Akira Kurata, Mitsukaido; Osamu Aoki, Matsudo, all of Japan

[73] Assignee: Mitsubishi Gas Chemical Co., Inc., Tokyo, Japan

[21] Appl. No.: 134,897

[22] Filed: Oct. 13, 1993

[30] Foreign Application Priority Data

Oct. 14, 1992 [JP] Japan .................. 4-276162

[51] Int. Cl.⁶ .................. C08G 18/67; C08G 18/52
[52] U.S. Cl. .................. 528/49; 528/50; 528/52; 528/53; 528/58; 528/75; 528/85; 528/59; 528/60; 528/65; 528/66; 522/90; 522/96; 359/642
[58] Field of Search .................. 528/49, 50, 52, 53, 528/58, 75, 85, 59, 60, 65, 66; 522/90, 96; 359/642

[56] References Cited

U.S. PATENT DOCUMENTS

| | | | |
|---|---|---|---|
| 2,858,297 | 10/1958 | Melamed | 528/75 |
| 2,879,250 | 3/1959 | Eisenmann et al. | 528/75 |
| 3,912,717 | 10/1975 | Giacobbe et al. | 540/608 |
| 5,034,492 | 7/1991 | Kawaki et al. | 528/75 |

FOREIGN PATENT DOCUMENTS

| | | |
|---|---|---|
| 104901 | 6/1982 | Japan . |
| 164615 | 9/1983 | Japan . |
| 60-199016 | 10/1985 | Japan . |
| 217229 | 10/1985 | Japan . |
| 197514 | 8/1989 | Japan . |
| 4-45115 | 2/1992 | Japan . |

*Primary Examiner*—John Kight, III
*Assistant Examiner*—Rabon Sergent
*Attorney, Agent, or Firm*—Sherman and Shalloway

[57] ABSTRACT

The present invention provides a composition comprising, as the essential components, an aromatic compound represented by the following general formula

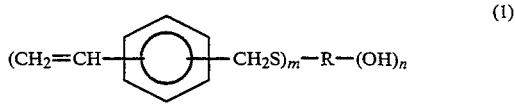

(1)

(m is an integer of 2-3, n is an integer of 1-3 and R is a hydrocarbon group of 3-6 carbon atoms or a hydrocarbon group of 3-6 carbon atoms containing a bivalent sulfur atom), an isocyanate compound and a radical polymerization initiator.

Said composition is useful for producing a plastic lens having a high refractive index, a small specific gravity, excellent heat resistance and excellent processability.

19 Claims, No Drawings

COMPOSITION FOR HIGH REFRACTIVE INDEX LENS COMPRISING A COPOLYMER OF A VINYLBENZYLTHIO COMPOUND

The present invention relates to a composition for high refractive index lens, suitable for use as an optical material, particularly a material for optical lenses such as spectacle lens and the like comprising a copolymer of a vinylbenzylthio compound.

There are widely used, as a spectacle lens for eyesight correction, cured lenses typified by poly[diethylene glycol bis(allyl carbonate)]. Spectacle lenses are required to have a small thickness at the periphery and lightweightness. A lens has a smaller thickness at the periphery when the lens has a higher refractive index, and a smaller lens thickness results in a lighter lens weight. A lighter lens weight is also obtained when the lens material, i.e. the material composition for lens has a smaller specific gravity. Hence, a lens of sufficiently high refractive index and small specific gravity is desired. The poly[diethylene glycol bis(allyl carbonate)], however, has a drawback of low refractive index (1.50) and large specific gravity of 1.32 and has no sufficient property.

A number of resins were proposed each as a resin for high refractive index lens. They are, for example, a resin obtained by a reaction between a bromine atom-containing hydroxy compound and an isocyanate compound (Japanese Laid-Open Patent Application No. 164615/1983), a resin obtained by a reaction between a sulfur atom-containing polyol compound and a polyisocyanate compound (Japanese Laid-Open Patent Application No. 217229/1985), a resin obtained by a reaction between a polythiol compound and a polyisocyanate compound (Japanese Laid-Open Patent Application No. 199016/1985), and a resin comprising a bromine atom-containing aromatic acrylic compound (Japanese Laid-Open Patent Application No. 104901/1982).

However, the resin comprising a bromine atom-containing aromatic acrylic compound has a high specific gravity and the resins obtained by a reaction between a polyol compound or a polythiol compound and a polyisocyanate compound have low heat resistance.

The present inventors previously found a resin obtained from a sulfur-containing aromatic vinyl compound and an isocyanate compound, as a resin for lens of high refractive index, small specific gravity, high strengths and high heat resistance (Japanese Laid-Open Patent Application No. 197514/1989). The present inventors made further study on a resin capable of giving a lens of higher refractive index, small specific gravity, high strengths and high heat resistance and completed the present invention.

According to the present invention there is provided a composition for high refractive index lens, comprising, as the essential components, an aromatic compound represented by the following general formula (1)

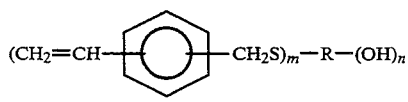
(1)

(m is an integer of 2-3, n is an integer of 1-3 and R is a hydrocarbon group of 3-6 carbon atoms or a hydrocarbon group of 3-6 carbon atoms containing a bivalent sulfur atom), an isocyanate compound and a radical polymerization initiator. The vinylbenzylthio compounds of the formula (1) in which m=2 or 3 and n=1, 2 or 3 are obtained by reacting a chloromethylstyrene with a di- or trimethylmercapto mono-, di- or trihydroxyalkyl and sodium hydroxide.

The aromatic compound represented by the general formula (1) can be exemplified by

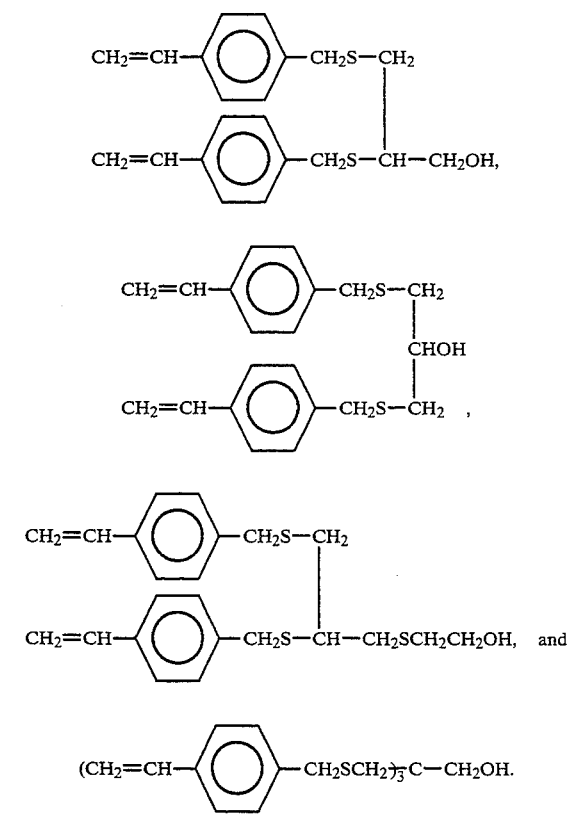

The meta-form isomers of the above compounds and mixtures thereof can also be used. The aromatic compound of the general formula (1) is not restricted thereto. The aromatic compound is preferably 1,3-bis(-vinylbenzylthio)-2-propanol, 2,3-bis(vinylbenzylthio)-1-propanol, 2-[2,3-bis(vinylbenzylthio)propylthio]-ethanol, 2,2,2-tris(vinylbenzylthiomethyl)ethanol, etc.

The isocyanate compound is preferably an aliphatic or aromatic polyisocyanate compound, and can be exemplified by m-xylylene diisocyanate, p-xylylene diisocyanate, toluylene diisocyanate, phenylene diisocyanate, 4,4'-diphenylmethane diisocyanate, bis-(isocyanatomethyl)cyclohexane, bis(isocyanatomethyl)thiophene, isophorone diisocyanate, hexamethylene diisocyanate, a reaction product obtained by converting hexamethylene diisocyanate to biuret, a reaction product between hexamethylene diisocyanate and trimethylolpropane, chlorinated products of said reaction products, and bromination products of said reaction products. The isocyanate compound is not restricted to these compounds. Particularly preferable as the isocyanate compound are m-xylylene diisocyanate, p-xylylene diisocyanate, toluylene diisocyanate, bis(isocyanatomethyl)cyclohexane, bis(isocyanatomethyl)thiophene, isophorone diisocyanate and hexamethylene diisocyanate. These isocyanates may be used in admixture of two or more.

The composition of the present invention comprises the aromatic compound of the general formula (1) and the isocyanate compound in such proportions that the ratio of the total moles of the hydroxyl group in the composition to the total moles of the isocyanate group in the composition is in the range of preferably 0.5:1 to 5:1, more preferably 0.75:1 to 3:1, most preferably 0.9:1 to 2:1. When the ratio is outside the range of 0.5:1 to 5:1, the composition, when cured, gives insufficient heat resistance and strengths.

The radical polymerization initiator used in the present invention can be any substance as long as it generates a radical when heated or irradiated with ultraviolet rays or an electron beam. It includes, for example, known thermal polymerization catalysts such as benzoyl peroxide, azobisisobutyronitrile and the like and known photopolymerization catalysts such as benzophenone, benzoin and the like. The amount of the radical polymerization catalyst used varies depending upon the components used in the composition and the curing method applied for the composition and cannot be determined in a specific range, but is generally in the range of 0.01–5.0% by weight, preferably 0.1–1.0% by weight.

The composition of the present invention may further comprise a small amount of a catalyst in order to make sufficient the reaction of the isocyanate compound to obtain a cured resin of high strengths and heat resistance. Such a catalyst includes, for example, tin compounds (e.g. dibutyltin dilaurate) and amine compounds. The amount of the catalyst used is generally 0.0001–5.0% by weight, preferably 0.001–1.0% by weight based on the total composition amount.

The composition of the present invention may be diluted with a radical-reactive compound such as styrene, chlorostyrene, divinylbenzene, benzyl acrylate, hydroxyethyl methacrylate or the like.

The composition of the present invention may furthermore comprise known additives such as antioxidant, ultraviolet absorber and the like, whereby the resulting resin has higher utility. The composition of the present invention may also comprise a known release agent, whereby the resulting resin has higher releasability.

The composition of the present invention can be made into a lens by pouring the composition into a glass- or metal-made mold, heating the composition and/or irradiating the composition with ultraviolet rays or an electron beam to give rise to a polymerization and curing reaction, and taking out the resulting resin lens from the mold. The curing time is generally 0.1–100 hours, preferably 12–48 hours, and the curing temperature is generally 10°–140° C., preferably 20°–120° C. As necessary, the resulting lens may be subjected to surface treatments for imparting hard coat, reflection prevention, fog resistance, etc.

The lens obtained as above from the composition of the present invention is colorless and transparent and has a high refractive index, a small specific gravity, light-weightness, high heat resistance, excellent processability, high strengths, etc. The lens can therefore be used in various applications as an optical material and is particularly preferable as a spectacle lens.

The present invention is hereinafter described in more detail by way of Examples. In the Examples, the cured resins obtained by polymerizing the compositions of the present invention were measured and rated for heat resistance and impact resistance as follows.

Heat resistance: A cured resin was measured for Vicat softening point (load=5 kg). When the Vicat softening point was 120° C. or higher, the heat resistance of the cured resin was rated as good.

Impact Resistance: A 20-g iron ball was dropped onto a cured resin [60 mm (dia.)×2.5 mm (thickness) from a height of 1.27 m. When no breakage occurred, the impact resistance of the cured resin was rated as good.

Example 1

There were uniformly mixed 80 parts by weight of 2,3-bis(vinylbenzylthio)-1-propanol obtained by a reaction between 2,3-dimercapto-1-propanol, chloromethylstyrene (m-form/p-form=7/3) and sodium hydroxide, 20 parts by weight of m-xylylene diisocyanate, 0.2 part by weight of tert-butyl peroxyneodecanoate [Perbutyl ND (trade name) manufactured by NIPPON OIL & FATS CO., LTD.] and 0.2 part by weight of 1,1-azobis(cyclohexane-1-carbonitrile) [V-40 (trade name) manufactured by Wako Pure Chemical Industries, Ltd.]. The mixture was poured into a mold consisting of a glass mold and a gasket, then subjected to linear temperature elevation from 35° C. to 110° C. in 15 hours, and kept at 110° C. for 1 hour to give rise to polymerization and curing. Incidentally, the ratio of the total moles of the hydroxyl group in the composition and the total moles of the isocyanate group in the composition was 1.06.

The cured material obtained was colorless and transparent and had an Abbe number ($v_D^{20}$) of 31, a very high refractive index ($N_D^{20}$) of 1.65 and a small specific gravity of 1.24. The cured material also had good heat resistance and impact resistance, and was excellent as a lens, particularly a spectacle lens.

Example 2

A composition was prepared and subjected to polymerization and curing in the same manner as in Example 1 with the exception that there were used 84 parts by weight of 1,3-bis(vinylbenzylthio)-1-propanol obtained by a reaction between 1,3-dimercapto-1-propanol, chloromethylstyrene (m-form/p-form=7/3) and sodium hydroxide and 16 parts by weight of m-xylylene diisocyanate. Incidentally, the ratio of the total moles of the hydroxyl group in the composition and the total moles of the isocyanate group in the composition was 1.39.

The cured material obtained was colorless and transparent and had an Abbe number ($v_D^{20}$) of 31, a very high refractive index ($N_D^{20}$) of 1.65 and a small specific gravity of 1.23. The cured material also had good heat resistance and impact resistance, and was excellent as a lens, particularly a spectacle lens.

Example 3

A composition was prepared and subjected to polymerization and curing in the same manner as in Example 1 with the exception that there were used 82 parts by weight of 2-[2,3-bis(vinylbenzylthio)-propylthio]-ethanol obtained by a reaction between 2-(2,3-dimercaptopropylthio)-ethanol, chloromethylstyrene (m-form/p-form=7/3) and sodium hydroxide and 18 parts by weight of m-xylylene diisocyanate. Incidentally, the ratio of the total moles of the hydroxyl group in the composition and the total moles of the isocyanate group in the composition was 1.03.

The cured material obtained was colorless and transparent and had an Abbe number ($v_D^{20}$) of 31, a very high refractive index ($N_D^{20}$) of 1.65 and a small specific gravity of 1.25. The cured material also had good heat resistance and impact resistance, and was excellent as a lens, particularly a spectacle lens.

Example 4

A composition was prepared and subjected to polymerization and curing in the same manner as in Example 1 with the exception that there were used 80 parts by weight of 2,3-bis(4-vinylbenzylthio)-1-propanol obtained by a reaction between, 2,3-dimercapto-1-propanol, p-chloromethylstyrene and sodium hydroxide and 20 parts by a weight of m-xylene diisocyanate. Incidentally, the ratio of the total moles of the hydroxyl group in the composition and the total moles of the isocyanate group in the composition was 1.06.

The cured material obtained was colorless and transparent and had an Abbe number ($\nu_D^{20}$) of 31, a very high refractive index ($N_D^{20}$) of 1.65 and a small specific gravity of 1.24. The cured material also had good heat resistance and impact resistance, and was excellent as a lens, particularly a spectacle lens.

Example 5

A composition was prepared and subjected to polymerization and curing in the same manner as in Example 1 with the exception that the amount of 2,3-bis-(vinylbenzylthio)-1-propanol was changed to 81 parts by weight and that 20 parts by weight of m-xylylene diisocyanate was changed to 19 parts by weight of hexamethylene diisocyanate. Incidentally, the ratio of the total moles of the hydroxyl group in the composition and the total moles of the isocyanate group in the composition was 1.0.

The cured material obtained was colorless and transparent and had an Abbe number ($\nu_D^{20}$) of 32, a very high refractive index ($N_D^{20}$) of 1.63 and a small specific gravity of 1.21. The cured material also had good heat resistance and impact resistance, and was excellent as a lens, particularly a spectacle lens.

Example 6

A composition was prepared and subjected to polymerization and curing in the same manner as in Example 1 with the exception that the amount of 2,3-bis(vinylbenzylthio)-1-propanol was changed to 76 parts by weight and that 20 parts by weight of m-xylylene diisocyanate was changed to 24 parts by weight of isophorone diisocyanate. Incidentally, the ratio of the total moles of the hydroxyl group in the composition and the total moles of the isocyanate group in the composition was 1.0.

The cured material obtained was colorless and transparent and had an Abbe number ($\nu_D^{20}$) of 33, a very high refractive index ($N_D^{20}$) of 1.62 and a small specific gravity of 1.19. The cured material also had good heat resistance and impact resistance, and was excellent as a lens, particularly a spectacle lens.

What is claims is:

1. A composition for a high refractive index lens, comprising an aromatic compound represented by the following general formula (1)

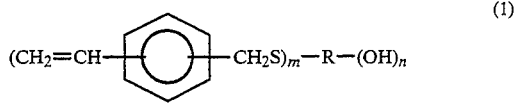

m is an integer of 2–3, n is an integer of 1–3 and R is a hydrocarbon group of 3–6 carbon atoms or a hydrocarbon group of 3–6 carbon atoms containing a bivalent sulfur atom, an isocyanate compound and a radical polymerization initiator, wherein the aromatic compound and the isocyanate compound are in amounts such that the ratio of moles of hydroxyl group to moles of isocyanate group in the composition is 0.5:1 to 5:1.

2. The composition for a high refractive index lens as set forth in claim 1, wherein the aromatic compound is a compound of the general formula (1) in which m is 2 or 3, n is 1 and R is

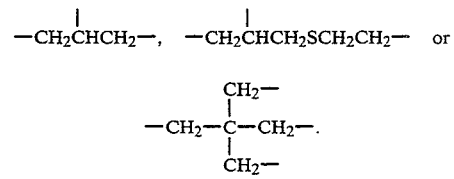

3. The composition for a high refractive index lens as set forth in claim 2, wherein the aromatic compound is at least one compound selected from 1,3-bis(vinylbenzylthio)-2-propanol, 2,3-bis(vinylbenzylthio)-1-propanol, 2-(2,3-bis(vinylbenzylthio)propylthio)-ethanol or 2,2,2-tris(vinylbenzylthiomethyl)-ethanol.

4. The composition for a high refractive index lens as set forth in claim 1, wherein the isocyanate compound is at least one compound selected from m-xylylene diisocyanate, p-xylylene diisocyanate, toluylene diisocyanate, phenylene diisocyanate, 4,4'-diphenylmethane diisocyanate, bis(isocyanatomethyl)-cyclohexane, bis-(isocyanatomethyl)-thiophene, isophorone diisocyanate, hexamethylene diisocyanate, a reaction product obtained by converting hexamethylene diisocyanate to biuret, a reaction product between hexamethylene diisocyanate and trimethylolpropane, chlorinated products of said reaction products, or brominated products of said reaction products.

5. The composition for a high refractive index lens as set forth in claim 4, wherein the isocyanate compound is at least one compound selected from m-xylylene diisocyanate, p-xylylene diisocyanate, toluylene diisocyanate, bis(isocyanatomethyl)cyclohexane, bis-(isocyanatomethyl)thiophene, isophorone diisocyanate or hexamethylene diisocyanate.

6. The composition for a high refractive index lens as set forth in claim 1, wherein the aromatic compound and the isocyanate compound are in amounts such that the ratio of the moles of the hydroxyl group to the moles of the isocyanate group in the composition is in the range of 0.75:1 to 3:1.

7. The composition for a high refractive index lens as set forth in claim 1, wherein the aromatic compound and the isocyanate compound are in amounts such that the ratio of the moles of the hydroxyl group to the moles of the isocyanate group in the composition is 0.9:1 to 2:1.

8. The composition for a high refractive index lens as set forth in claim 1, which comprises the radical polymerization initiator in an amount of 0.01–5.0% by weight based on the total composition weight.

9. The composition for a high refractive index lens as set forth in claim 8, which comprises the radical polymerization initiator in an amount of 0.1–1.0% by weight based on the total composition weight.

10. The composition for a high refractive index lens as set forth in claim 1, which additionally comprises a tin compound or an amine compound in an amount of 0.0001–5.0% by weight based on the total composition weight.

11. The composition for a high refractive index lens as set forth in claim 10, which comprises the tin compound or the amine compound in an amount of 0.001–1.0% by weight based on the total composition weight.

12. A plastic lens produced by subjecting the composition of any of the claims 1–4, 6, 8 or 10 to polymerization and curing.

13. A composition for a high refractive index lens, comprising an aromatic compound represented by the following general formula (1)

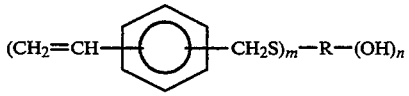
(1)

m is an integer of 2–3, n is an integer of 1 and R is an alkyl hydrocarbon group of 3–6 carbon atoms or an alkyl hydrocarbon group of 3–6 carbon atoms containing a bivalent sulfur atom, an isocyanate compound and a radical polymerization initiator, wherein the aromatic compound and the isocyanate compound are in amounts such that the ratio of moles of hydroxyl group to moles of isocyanate group in the composition is 0.5:1 to 5:1.

14. The composition for a high refractive index lens as set forth in claim 13, wherein the aromatic compound is at least one compound selected from 1,3-bis(vinylbenzylthio)-2-propanol, 2,3-bis(vinylbenzylthio)-1-propanol or 2-(2,3-bis(vinylbenzylthio)propylthio)-ethanol.

15. The composition for a high refractive index lens as set forth in claim 13, wherein the isocyanate compound is at least one compound selected from m-xylylene diisocyanate, p-xylylene diisocyanate, toluylene diisocyanate, bis(isocyanatomethyl)cyclohexane, bis-(isocyanatomethyl)thiophene, isophorone diisocyanate or hexamethylene, diisocyanate.

16. The composition for a high refractive index lens as set forth in claim 13, wherein the aromatic compound and the isocyanate compound are in amounts such that the ratio of the moles of the hydroxyl group to the moles of the isocyanate group in the composition is in the range of 0.9:1 to 2:1.

17. The composition for a high refractive index as set forth in claim 13, which comprises the radical polymerization initiator in an amount of 0.1–1.0% by weight based on the total composition weight.

18. The composition for a high refractive index lens as set forth in claim 13, which comprises a tin compound or an amine compound in an amount of 0.0001–1.0% by weight based on the total composition weight.

19. A plastic lens produced by subjecting the composition of any of the claims 13 or 14–18 to polymerization and curing.

* * * * *